F. E. KEHL.
VEHICLE BODY.
APPLICATION FILED DEC. 6, 1916.

1,218,090.

Patented Mar. 6, 1917.

Witness:
Geo. Johnson

Frank E. Kehl
Inventor
by James W. See
Attorney

UNITED STATES PATENT OFFICE.

FRANK E. KEHL, OF CONNERSVILLE, INDIANA, ASSIGNOR TO THE DAN PATCH NOVELTY COMPANY, OF CONNERSVILLE, INDIANA, A COPARTNERSHIP COMPOSED OF E. W. ANSTED, GEORGE W. ANSTED, AND FRANK E. KEHL.

VEHICLE-BODY.

1,218,090.  Specification of Letters Patent.  Patented Mar. 6, 1917.

Application filed December 6, 1916. Serial No. 135,357.

*To all whom it may concern:*

Be it known that I, FRANK E. KEHL, a citizen of the United States, residing at Connersville, Fayette county, Indiana, have invented certain new and useful Improvements in Vehicle-Bodies, of which the following is a specification.

This invention relates to a construction of body for small vehicles for juvenile use, the body being adapted for support on wheels, the operator sitting on the body and propelling the vehicle by spasmodic action of his feet upon the ground. Such is the case where no pedal mechanism is provided for otherwise propelling the vehicle, and it is of high importance that the body be of adequate vertical strength and so dimensioned sidewise as to be suited for convenient straddling by the operator's legs.

My invention will be readily understood from the following description taken in connection with the accompanying drawing in which:—

Figure 1:
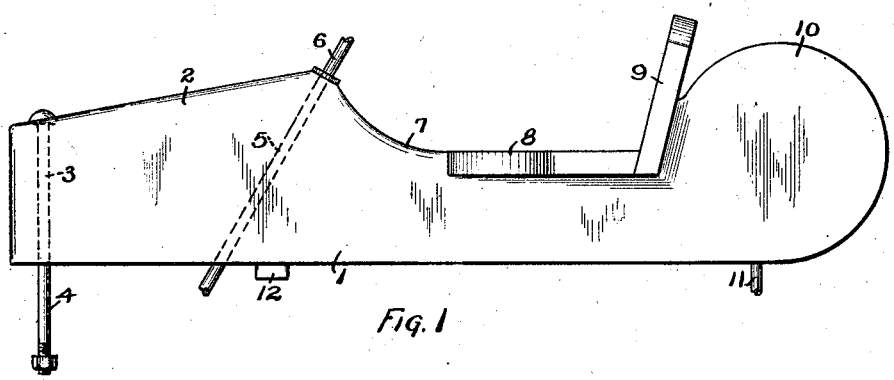

Figure 1 is a side elevation of a vehicle body exemplifying my invention: and

Figure 2:
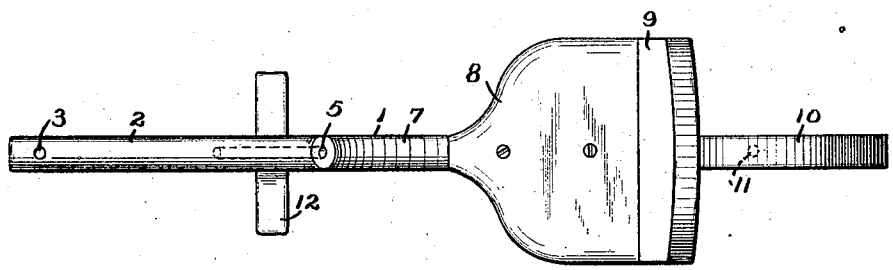

Fig. 2 a plan of the same.

In the drawing:—

1, indicates the body proper which is a thin horizontal member set vertically edgewise and adapted to have its front and rear portions supported by wheels:

2, the general forward portion of the body whose top is somewhat elevated:

3, a vertical bearing in the body near its extreme front:

4, the kingbolt by means of which the body is to be coupled to the front axle:

5, a diagonal bearing in the body, its upper end being at the rear extremity of the forward portion 2, and its lower end being forward of its upper end:

6, the steering-shaft journaled in the bearing 5 and adapted to receive a steering-wheel at its upper end and having its lower end connected with the front axle:

7, a depressed portion of the body rearward of the bearing 5:

8, a seat secured to the depressed portion of the body and extending sidewise from the body:

9, the back of the seat, secured to the seat and to the body:

10, a vertically widened portion of the body at the rear of the seat-back:

11, a bolt typifying means for securing the rear axle to the body: and 12, the foot-rests.

The lower outline of the body proper is horizontal while the top of the forward portion 2 declines forwardly and the rear vertical wide portion 10 is illustrated as being of generally circular form, the seat occupying a position in the depression between the upwardly widened body-portions 2 and 10. When the body is formed with the particular outlines illustrated, it is suggestive of the body of an automobile provided with a tapering hood and with a circular fuel tank disposed at its rear. The body is of simple construction and possesses very considerable strength and gives substantial support for the seat and seat-box and furnishes long well-protected bearings for the kingbolt and steering-shaft, and the structure is well calculated to withstand the hard usage to which vehicles operated by children are quite apt to be subjected. The location of the seat in the depression of the body proper, facilitates the convenient reaching of the ground by the feet of the operator, and the thinness of the body immediately forward of the seat, permits of convenient straddling by the operator.

I claim:—

A vehicle body comprising, a thin longitudinal body proper set vertically edgewise and provided with a kingbolt bearing at its front and with a steering-shaft bearing to the rear of the kingbolt bearing and with a top depression at the rear of the steering-shaft bearing, and a seat and seat back secured in said depression and extending sidewise of the body proper, combined substantially as set forth.

FRANK E. KEHL.

Witnesses:
L. L. LYDY,
BERNICE K. RECH.